US011985418B2

(12) United States Patent
Yokoyama et al.

(10) Patent No.: US 11,985,418 B2
(45) Date of Patent: May 14, 2024

(54) IMAGING SYSTEM, IMAGING METHOD, NON-TRANSITORY COMPUTER-READABLE STORAGE MEDIUM AND MOVING APPARATUS

(71) Applicant: CANON KABUSHIKI KAISHA, Tokyo (JP)

(72) Inventors: Shuma Yokoyama, Kanagawa (JP); Koji Nishimori, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 130 days.

(21) Appl. No.: 17/946,102

(22) Filed: Sep. 16, 2022

(65) Prior Publication Data

US 2023/0102313 A1 Mar. 30, 2023

(30) Foreign Application Priority Data

Sep. 24, 2021 (JP) ................................ 2021-155261

(51) Int. Cl.

*H04N 23/65* (2023.01)
*B64C 39/02* (2023.01)
*B64U 50/34* (2023.01)

(52) U.S. Cl.

CPC ........... *H04N 23/65* (2023.01); *B64C 39/024* (2013.01); *B64U 50/34* (2023.01); *B64U 2201/20* (2023.01)

(58) Field of Classification Search

CPC ...... H04N 23/65; B64C 39/024; B64U 50/34; B64U 2201/20; B64U 2101/30; B64U 50/30

See application file for complete search history.

(56) References Cited

U.S. PATENT DOCUMENTS

2018/0354620 A1* 12/2018 Baek .................... B64C 39/024
2019/0349529 A1* 11/2019 Achtelik ............... B64U 20/87
2020/0044463 A1* 2/2020 Kim ..................... H02J 7/0044
2022/0411057 A1* 12/2022 Nakada ................. H04N 23/57

FOREIGN PATENT DOCUMENTS

WO 2018/105054 A1 6/2018

* cited by examiner

*Primary Examiner* — Shahbaz Nazrul
(74) *Attorney, Agent, or Firm* — Cowan, Liebowitz & Latman, P.C.

(57) ABSTRACT

An imaging system, having an imaging apparatus and a moving apparatus that moves with the imaging apparatus mounted thereon, includes: a first acquisition unit configured to acquire a movable time, which is a time when the moving apparatus is capable of moving, based on a residual battery capacity of a first power supply that supplies power to the moving apparatus; a second acquisition unit configured to acquire an imageable time, which is a time when the imaging apparatus is capable of imaging, based on a residual battery capacity of a second power supply that supplies power to the imaging apparatus; and a control unit configured to control whether power is fed from the second power supply to the moving apparatus or power is fed from the first power supply to the imaging apparatus, based on at least one of the movable time and the imageable time.

16 Claims, 6 Drawing Sheets

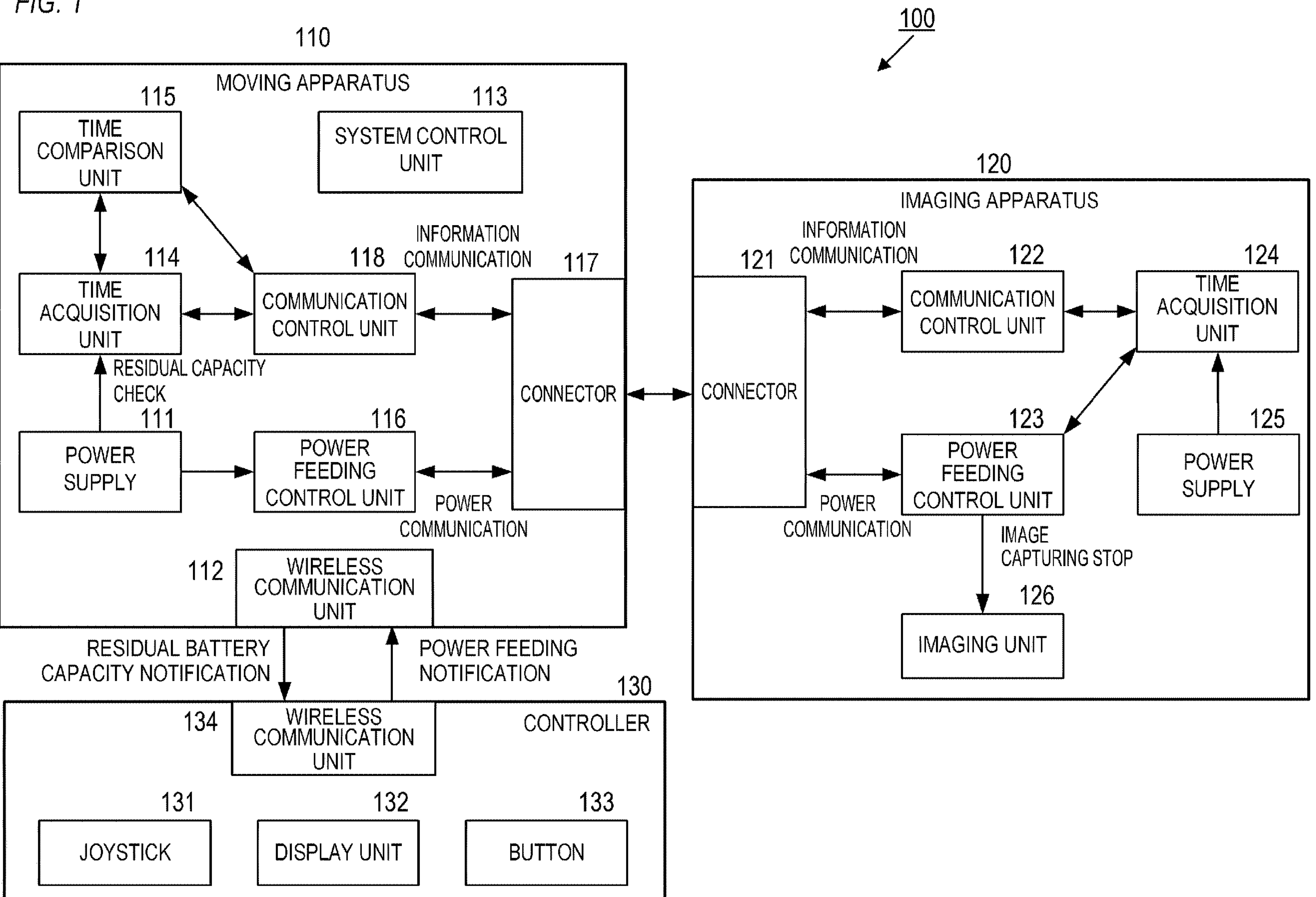
FIG. 1
100
110
MOVING APPARATUS
115
TIME COMPARISON UNIT
113
SYSTEM CONTROL UNIT
114
TIME ACQUISITION UNIT
118
COMMUNICATION CONTROL UNIT
INFORMATION COMMUNICATION
117
CONNECTOR
RESIDUAL CAPACITY CHECK
111
POWER SUPPLY
116
POWER FEEDING CONTROL UNIT
POWER COMMUNICATION
112
WIRELESS COMMUNICATION UNIT
RESIDUAL BATTERY CAPACITY NOTIFICATION
POWER FEEDING NOTIFICATION
130
CONTROLLER
134
WIRELESS COMMUNICATION UNIT
131
JOYSTICK
132
DISPLAY UNIT
133
BUTTON
120
IMAGING APPARATUS
121
CONNECTOR
INFORMATION COMMUNICATION
122
COMMUNICATION CONTROL UNIT
124
TIME ACQUISITION UNIT
123
POWER FEEDING CONTROL UNIT
125
POWER SUPPLY
POWER COMMUNICATION
IMAGE CAPTURING STOP
126
IMAGING UNIT 300
START
S301
ACQUIRE MOVABLE TIME
S302
ACQUIRE IMAGEABLE TIME
S303
MOVABLE TIME < IMAGEABLE TIME
YES
NO
S306
MOVABLE TIME > IMAGEABLE TIME
YES
NO
S307
FEED POWER FROM POWER SUPPLY 111 TO POWER SUPPLY 125
S308
MOVABLE TIME = IMAGEABLE TIME
NO
YES
S304
FEED POWER FROM POWER SUPPLY 125 TO POWER SUPPLY 111
S305
MOVABLE TIME = IMAGEABLE TIME
NO
YES
END

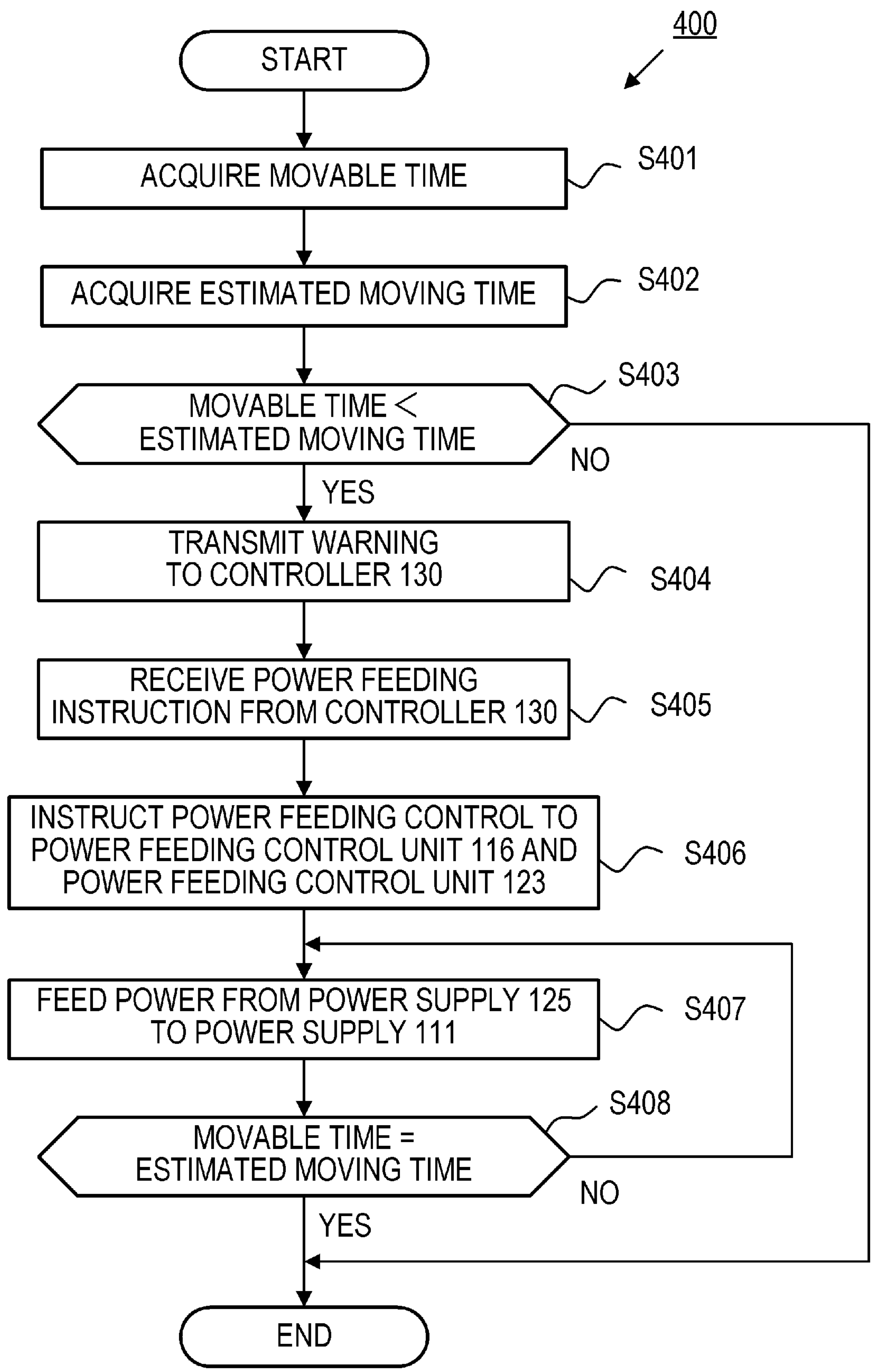
FIG. 4
400
START
ACQUIRE MOVABLE TIME
S401
ACQUIRE ESTIMATED MOVING TIME
S402
MOVABLE TIME < ESTIMATED MOVING TIME
S403
NO
YES
TRANSMIT WARNING TO CONTROLLER 130
S404
RECEIVE POWER FEEDING INSTRUCTION FROM CONTROLLER 130
S405
INSTRUCT POWER FEEDING CONTROL TO POWER FEEDING CONTROL UNIT 116 AND POWER FEEDING CONTROL UNIT 123
S406
FEED POWER FROM POWER SUPPLY 125 TO POWER SUPPLY 111
S407
MOVABLE TIME = ESTIMATED MOVING TIME
S408
NO
YES
END 500
START
S501
RESIDUAL BATTERY CAPACITY OF POWER SUPPLY 111 IS LESS THAN 10%
NO
YES
S502
STOP IMAGE CAPTURING OF IMAGING APPARATUS 120
S503
FEED POWER FROM POWER SUPPLY 125 TO POWER SUPPLY 111
S504
RESIDUAL BATTERY CAPACITY OF POWER SUPPLY 111 IS 10% OR MORE
NO
YES
END

IMAGING SYSTEM, IMAGING METHOD, NON-TRANSITORY COMPUTER-READABLE STORAGE MEDIUM AND MOVING APPARATUS

BACKGROUND OF THE INVENTION

Field of the Invention

The present invention relates to an imaging system, an imaging method, a storage medium and a moving apparatus.

Description of the Related Art

WO 2018/105054 discloses a method for implementing long distance navigation of a drone, which flies with a camera mounted thereon, by controlling the drone to fly via charging stations.

However, the cost of capital investment in the charging stations is high, and in order to recharge drones during moving, the navigation routes of the drones are limited to routes via the locations of the charging stations.

In a case where it is difficult to recharge a drone during moving, the drone (moving apparatus) may not reach a destination if residual battery capacity is insufficient. Further, if residual battery capacity is insufficient, the camera (imaging apparatus) may stop imaging processing.

SUMMARY OF THE INVENTION

With the foregoing in view, it is an object of the present disclosure to suppress a decrease in movable time while continuing the imaging processing in an imaging system constituted of a moving apparatus and an imaging apparatus.

An imaging system according to the present disclosure is the imaging system having an imaging apparatus and a moving apparatus that moves with the imaging apparatus mounted thereon, the imaging system including at least one memory and at least one processor which function as: a first acquisition unit configured to acquire a movable time, which is a time when the moving apparatus is capable of moving, based on a residual battery capacity of a first power supply that supplies power to the moving apparatus; a second acquisition unit configured to acquire an imageable time, which is a time when the imaging apparatus is capable of imaging, based on a residual battery capacity of a second power supply that supplies power to the imaging apparatus; and a control unit configured to control whether power is fed from the second power supply to the moving apparatus or power is fed from the first power supply to the imaging apparatus, based on at least one of the movable time and the imageable time.

An imaging method according to the present disclosure is an imaging method for an imaging system having an imaging apparatus and a moving apparatus that moves with the imaging apparatus mounted thereon, the imaging method including steps of: acquiring a movable time, which is a time when the moving apparatus is capable of moving, based on a residual battery capacity of a first power supply that supplies power to the moving apparatus; acquiring an imageable time, which is a time when the imaging apparatus is capable of imaging, based on a residual battery capacity of a second power supply that supplies power to the imaging apparatus; and controlling whether power is fed from the second power supply to the moving apparatus or power is fed from the first power supply to the imaging apparatus, based on at least one of the movable time and the imageable time.

A non-transitory computer-readable storage medium according to the present disclosure stores a program to cause a computer to execute an imaging method for an imaging system having an imaging apparatus and a moving apparatus that moves with the imaging apparatus mounted thereon, the imaging method including steps of: acquiring a movable time, which is a time when the moving apparatus is capable of moving, based on a residual battery capacity of a first power supply that supplies power to the moving apparatus; acquiring an imageable time, which is a time when the imaging apparatus is capable of imaging, based on a residual battery capacity of a second power supply that supplies power to the imaging apparatus; and controlling whether power is fed from the second power supply to the moving apparatus or power is fed from the first power supply to the imaging apparatus, based on at least one of the movable time and the imageable time.

A moving apparatus according to the present disclosure is the moving apparatus moving with an imaging apparatus mounted thereon, the moving apparatus including: a first acquisition unit configured to acquire a movable time, which is a time when the moving apparatus is capable of moving, based on a residual battery capacity of a first power supply that supplies power to the moving apparatus; a second acquisition unit configured to acquire information on an imageable time, which is a time when the imaging apparatus is capable of imaging, from the imaging apparatus; and a control unit configured to control whether power is fed from a second power supply, which supplies power to the imaging apparatus, to the moving apparatus, or power is fed from the first power supply to the imaging apparatus, based on at least one of the movable time and the imageable time.

Further features of the present invention will become apparent from the following description of exemplary embodiments with reference to the attached drawings.

BRIEF DESCRIPTION OF THE DRAWINGS

FIG. 1 is a block diagram for describing composing elements of a moving imaging system 100;

FIG. 4 is a flow chart for describing power feeding control processing 400 according to Embodiment 2;

DESCRIPTION OF THE EMBODIMENTS

Embodiments of the present invention will now be described. The present invention, however, is not limited to the following embodiments.

Embodiment 1

The user, who uses an imaging apparatus (e.g. digital camera) that can capture a still image or a moving image, can capture a still image or a moving image in various scenes. Some imaging apparatuses have a function to acquire an image or control image capturing by linking with another electronic device (e.g. smartphone).

Some moving apparatuses having a flying function (e.g. drone) can mount an imaging apparatus (e.g. single-lens reflex). In an imaging system which includes an imaging apparatus and a moving apparatus, the moving apparatus flies in a state of mounting an imaging apparatus, and the moving apparatus and the imaging apparatus are controlled in a linked state, whereby still images or moving images in various angles of view can be aerially captured.

The aerial image capturing time of the imaging system is influenced by the battery capacity that supplies power to the imaging apparatus and the moving apparatus. When residual battery capacity becomes insufficient, the moving apparatus starts to have difficulty continuing the navigation. Also when residual battery capacity becomes insufficient, the imaging apparatus starts to have difficulty continuing the imaging processing. Thus if residual battery capacity of either one of the moving apparatus and the imaging apparatus becomes insufficient, the aerial image capturing by the imaging system may be interrupted. For example, if power is not supplied to the moving apparatus, the moving apparatus may not reach the destination.

The imaging system of Embodiment 1 acquires a movable time, which is time when the moving apparatus is capable of moving (flying), and an imageable time, which is time when the imaging apparatus is capable of imaging. Based on at least one of the movable time of the moving apparatus and the imageable time of the imaging apparatus, the imaging system controls whether power is fed from the imaging apparatus to the moving apparatus, or power is fed from the moving apparatus to the imaging apparatus. Thereby the imaging system can suppress a decrease in the movable time while continuing the imaging processing.

Figure 2A:
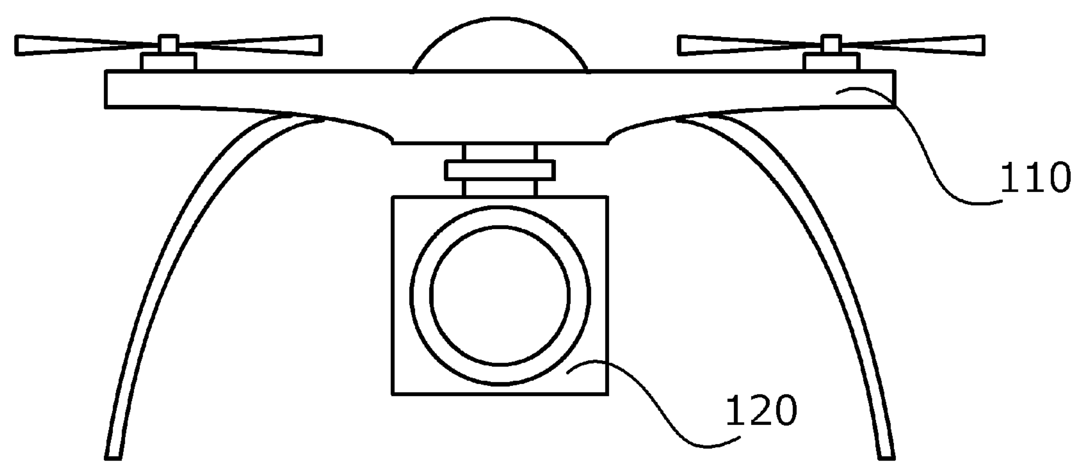
FIGS. 2A and 2B are diagrams for describing an example of an appearance of the moving imaging system 100.
Figure 2B:
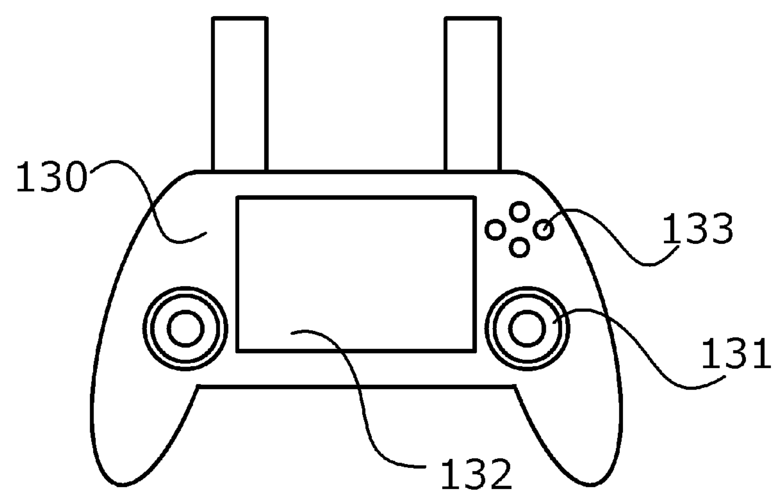

FIGS. 2A and 2B are diagrams for describing an example of an appearance of the moving imaging system 100.

In FIG. 2A, a moving apparatus 110 moves with mounting an imaging apparatus 120. In the following description, the imaging apparatus that moves with mounting the imaging apparatus 120 is assumed to be a drone, but is not limited to a drone, and may be a vehicle or a robot, for example. The imaging apparatus 120 is mounted on the moving apparatus 110 and captures still images or moving images. The imaging apparatus 120 may be detachable from the moving apparatus 110, so as to be functionable independently from the moving apparatus 110. In FIG. 2B, a controller 130 includes a joystick 131, a display unit 132 and buttons 133. The joystick 131 controls flying of the moving apparatus 110. The display unit 132 displays various information related to the moving apparatus 110 and the imaging apparatus 120. The buttons 133 select information or operation displayed on the display unit 132. Using these functions, the controller 130 can remote control the flying operation of the moving apparatus 110 and the imaging operation of the imaging apparatus 120.

FIG. 1 is a block diagram for describing composing elements of the moving imaging system 100 according to Embodiment 1.

The composing elements of the moving apparatus 110 will be described with reference to FIG. 1. A power supply 111 (first power supply) includes a battery, and supplies power to the moving apparatus 110. The power supply 111 also includes a power supply circuit to drive the moving apparatus 110 using power supplied from an external device. The power supply circuit includes a DC/DC convertor or a regulator. The power supply circuit supplies power supplied from the imaging apparatus 120 to each composing element to control the driving of the moving apparatus 110, including a wireless communication unit 112, a system control unit 113, a time acquisition unit 114, a time comparison unit 115, a power feeding control unit 116 and a communication control unit 118. The wireless communication unit 112 is a communication unit on the moving apparatus 110 side, for the moving apparatus 110 and the controller 130 to communicate wirelessly. The wireless communication unit 112 conforms to such a wireless communication method as a wireless LAN, for example. The wireless communication unit 112 receives various information related to the moving apparatus 110 and the imaging apparatus 120 from the controller 130. The wireless communication unit 112 also transmits various information related to the power supply 111 and a power supply 125 of the imaging apparatus 120 to the controller 130. The system control unit 113 manages and controls the moving imaging system 100 in general. The system control unit 113 includes a central processing unit (CPU), so as to control the flying of the moving apparatus 110 and the imaging of the imaging apparatus 120, and to process various data that are transmitted/received via the wireless communication unit 112.

The time acquisition unit 114 acquires the movable time, which is time when the moving apparatus 110 is capable of moving (flying). The time acquisition unit 114 may acquire residual battery capacity of the power supply 111, and acquire the time when the moving apparatus 110 can move continuously based on the residual battery capacity. The time comparison unit 115 compares the movable time of the moving apparatus 110 acquired by the time acquisition unit 114 and the imageable time of the imaging apparatus 120 acquired by the time acquisition unit 124. The time comparison unit 115 may be disposed on the imaging apparatus 120 or the controller 130. The power feeding control unit 116 controls the power feeding direction between the power supply 111 of the moving apparatus 110 and the power supply 125 of the imaging apparatus 120. The power feeding control unit 116 controls whether power is fed from the power supply 111 to the power supply 125, or from the power supply 125 to the power supply 111 via a connector 117. The connector 117 is an interface, which allows to communicate with the imaging apparatus 120 and to receive power from the imaging apparatus 120, and is disposed on the moving apparatus 110 side. The connector 117 is a USB-C connector, for example, and is connected to the imaging apparatus 120 via a USB-C cable. The communication control unit 118 controls communication between the moving apparatus 110 and the imaging apparatus 120 via the connector 117.

The composing elements of the imaging apparatus 120 will be described with reference to FIG. 1. A connector 121 is an interface that allows to communicate with the moving apparatus 110 and to receive power from the moving apparatus 110, and is disposed on the imaging apparatus 120 side. The connector 121 is a USB-C connector, for example, and is connected to the moving apparatus 110 via a USB-C cable. A communication control unit 122 controls communication between the moving apparatus 110 and the imaging apparatus 120 via the connector 121. A power feeding control unit 123 controls the power feeding direction between the power supply 111 of the moving apparatus 110 and a power supply 125 of the imaging apparatus 120. The power feeding control unit 123 controls whether the power is fed from the power supply 125 to the power supply 111, or from the power supply 111 to the power supply 125, via the connector 121. A time acquisition unit 124 acquires imageable time which is the time when the imaging apparatus 120 is capable of capturing images. The time acquisition unit 124 may acquire the residual battery capacity of the power supply 125 and acquire the time when the imaging apparatus 120 can continuously capture images based on the residual battery capacity. The power supply 125 (second power supply) includes a battery and supplies power to the imaging apparatus 120. The power supply 125 also includes a power supply circuit that drives the imaging apparatus 120 using power externally supplied. The power supply circuit includes a DC/DC convertor or a regulator. The power supply circuit supplies the power supplied from the moving apparatus 110 to each composing element related to the driving of the imaging apparatus 120, which includes at least one of the communication control unit 122, the power feeding control unit 123, the time acquisition unit 124 and an imaging unit 126. For the captured image data, the imaging unit 126 performs processing to correct images and processing to record the images.

The composing elements of the controller 130 will be described with reference to FIG. 1. A wireless communication unit 134 is a communication unit on the controller 130 side for the moving apparatus 110 and the controller 130 to communicate wirelessly. The wireless communication unit 134 conforms to such a wireless communication method as wireless LAN, for example. The wireless communication unit 134 transmits various information related to the control of the moving apparatus 110 and the imaging apparatus 120 to the moving apparatus 110. The wireless communication unit 134 also receives various information related to the power supply 111 of the moving apparatus 110 and the power supply 125 of the imaging apparatus 120 from the moving apparatus 110.

In Embodiment 1, the moving apparatus 110 and the imaging apparatus 120 can communicate with each other via the connector 117, the communication control unit 118, the communication control unit 122 and the connector 121. Thereby the imaging apparatus 120 can transmit information on the imageable time of the imaging apparatus 120 and the residual battery capacity of the power supply 125 from the imaging apparatus 120 to the moving apparatus 110. Further, the power feeding control unit 116 of the moving apparatus 110 and the power feeding control unit 123 of the imaging apparatus 120 can share information on the residual battery capacity and control. For example, the power feeding control unit 116 can acquire information on the residual battery capacity of the power supply 125 of the imaging apparatus 120 and information on the imageable time acquired by the time acquisition unit 124. Further, the power feeding control unit 123 can receive information related to the power feeding control received from the moving apparatus 110 and an instruction from an operator to operate the controller 130, for example. In the following description, it is assumed that the power feeding control unit 116 and the power feeding control unit 123 are interlocked via USB communication.

Figure 3:
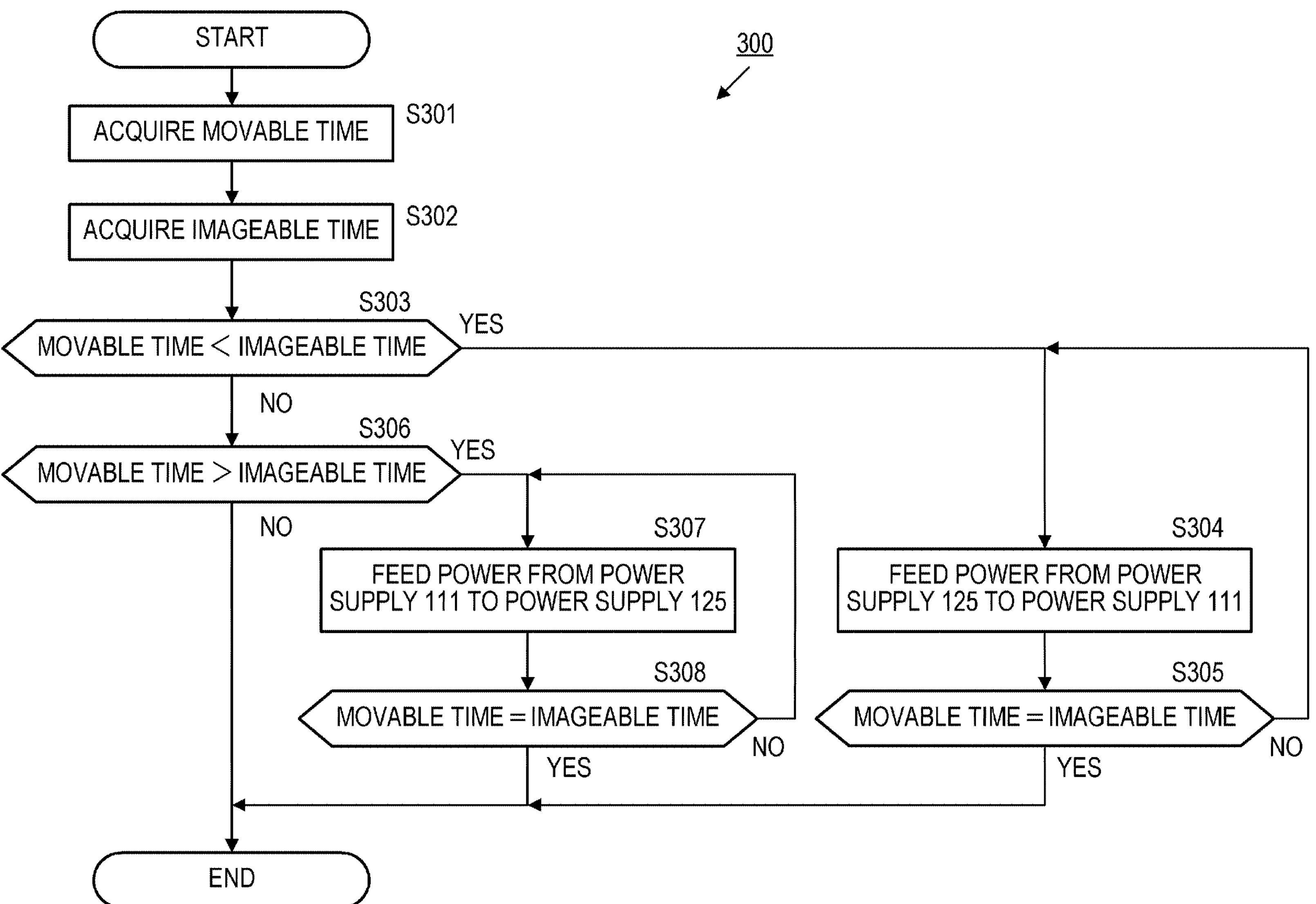
FIG. 3 is a flow chart for describing power feeding control processing 300 according to Embodiment 1.

FIG. 3 is a flow chart for describing the power feeding control processing 300. The power feeding control processing 300 of the moving imaging system 100 according to Embodiment 1 will be described with reference to FIG. 3.

By performing the power feeding control processing 300, the moving imaging system 100 selects whether power is fed from the power supply 111 of the moving apparatus 110 to the power supply 125 of the imaging apparatus 120, or whether power is fed from the power supply 125 to the power supply 111. By switching the power feeding direction, the moving imaging system 100 can supply power appropriate for the moving apparatus 110 or the imaging apparatus 120.

The power feeding control processing 300 is executed by the time acquisition unit 114, the time acquisition unit 124, the time comparison unit 115, the power feeding control unit 116, the power feeding control unit 123, and the system control unit 113 of the moving imaging system 100. The power feeding control processing 300 is started at a timing when the imaging apparatus 120 starts capturing a moving image.

In step S301, the time acquisition unit 114 of the moving apparatus 110 acquires the movable time. In Embodiment 1, the time acquisition unit 114 acquires the movable time based on the residual battery capacity of the power supply 111. For example, the time acquisition unit 114 may acquire the movable time based on the power consumption per-unit-time in a case where the moving apparatus 110 navigates at an average flying speed determined in the apparatus specification and the residual battery capacity of the power supply 111 at the present moment. Instead of the power consumption per-unit-time in the case where the moving apparatus 110 navigates at an average flying speed, the time acquisition unit 114 may acquire the movable time based on the power consumption at the flying speed and the residual battery capacity of the power supply 111 at the present moment, for example.

In step S302, the time acquisition unit 124 of the imaging apparatus 120 acquires the imageable time. In Embodiment 1, the time acquisition unit 124 acquires the imageable time based on the residual battery capacity of the power supply 125. For example, the time acquisition unit 124 may acquire the imageable time based on the power consumption per-unit-time used when the imaging apparatus 120 captures the moving image and the residual battery capacity of the power supply 125 at the present moment. The time acquisition unit 124 may also acquire the imageable time based on the average image capturing intervals in the still image capturing, the power consumption per image, and the residual battery capacity of the power supply 125, for example.

In step S303, the time comparison unit 115 compares the movable time and the imageable time. In Embodiment 1, the imageable time is transferred from the time acquisition unit 124 on the imaging apparatus 120 side to the time comparison unit 115 of the moving apparatus 110 via USB communication. The time comparison unit 115 of the moving apparatus 110 receives information on the imageable time, including the residual battery capacity of the power supply 125 and the power consumption per-unit-time, from the imaging apparatus 120, so as to acquire the imageable time of the imaging apparatus 120. The system control unit 113 advances processing to step S304 if the movable time is less than the imageable time. The system control unit 113 advances processing to step S306 if the movable time exceeds the imageable time.

In step S304, the power feeding control unit 116 and the power feeding control unit 123 switches the power feeding direction so that the power is fed from the power supply 125 of the imaging apparatus 120 to the power supply 111 of the moving apparatus 110. The power feeding control unit 116 controls so that the power supplied from the battery of the power supply 125 is fed to each composing element related to driving of the moving apparatus 110 via the power supply circuit included in the power supply 111. The power feeding control unit 116 may control so that the battery of the power supply 111 is charged using the power supplied from the power supply 125.

In step S305, the time comparison unit 115 determines whether the movable time and the imageable time match. The time comparison unit 115 may determine that the movable time and the imageable time match in a case where the difference between the movable time and the imageable time is less than a predetermined threshold. The predetermined threshold may be one to three minutes, for example. If the movable time and the imageable time do not match, the power feeding control unit 116 and the power feeding control unit 123 perform the processing in step S304 again. If the movable time and the imageable time match, the system control unit 113 ends the power feeding control processing. Thus in the case where the movable time is less than the imageable time, the power feeding control unit 116 and the power feeding control unit 123 control so that power is fed from the power supply 125 to the power supply 111 until the difference between the movable time and the imageable time becomes a predetermined threshold or less. Thereby the interruption of aerial image capturing, due to the insufficiency of movable time, can be prevented.

In step S306, the time comparison unit 115 compares the movable time and the imageable time. If the movable time exceeds the imageable time, the system control unit 113 advances the processing to step S307. If the movable time does not exceed the imageable time, the power feeding control unit 116 and the power feeding control unit 123 end the power feeding control processing 300.

In step S307, the power feeding control unit 116 and the power feeding control unit 123 switch the power feeding direction so that the power is fed from the power supply 111 of the moving apparatus 110 to the power supply 125 of the imaging apparatus 120. The power feeding control unit 123 controls so that the power supplied from the power supply 111 is fed to each composing element related to the driving of the imaging apparatus 120 via the power supply circuit included in the power supply 125. The power feeding control unit 123 may control so that the battery of the power supply 125 is charged using the power supplied from the power supply 111.

In step S308, the time comparison unit 115 determines whether the movable time and the imageable time match. The time comparison unit 115 may determine that the movable time and the imageable time match in a case where the difference between the movable time and the imageable time is less than a predetermined threshold. The predetermined thresholds used for the determination in step S305 and in step S308 may be the same or different values. If the movable time and the imageable time do not match, the power feeding control unit 116 and the power feeding control unit 123 perform the processing in step S307 again. If the movable time and the imageable time match, the system control unit 113 ends the power feeding control processing. Thus in the case where the movable time exceeds the imageable time, the power feeding control unit 116 and the power feeding control unit 123 control so that power is fed from the power supply 111 to the power supply 125 until the difference between the movable time and the imageable time becomes a predetermined threshold or less. Thereby the interruption of aerial image capturing, due to the insufficiency of the imageable time, can be prevented. The system control unit 113 repeatedly executes the processing steps S301 to S308 at predetermined intervals.

In Embodiment 1, the power feeding control processing 300 is started at the timing when the imaging apparatus 120 starts capturing a moving image, but the present invention is not limited to this, and may be started, for example, at the timing when the imaging apparatus 120 starts processing of which power consumption is larger than the current processing. For example, the start timing of the power feeding control processing 300 may be a timing when an image capturing for a predetermined number of frames starts in a moving image capturing, or a timing when one frame of image capturing starts in a still image capturing. Further, the start timing of the power feeding control processing 300 may be determined based on the operation state on the moving apparatus 110 side. For example, the start timing of the power feeding control processing 300 may be a timing when the altitude of the moving apparatus 110 rises, a timing when the air speed changed, or a timing when the power consumption of the moving apparatus 110 increases. Furthermore, the start timing of the power feeding control processing 300 may be timing when the driving time of the moving apparatus 110 reached a predetermined time. The system control unit 113 may also start the power feeding control processing 300 at predetermined intervals when the power of the moving apparatus 110 is ON.

In Embodiment 1, a USB-C interface is used to communicate and feed power between the moving apparatus 110 and the imaging apparatus 120, so that the apparatuses connected by USB-C can feed power to each other. The connecting method is not limited to USB-C, but may be any interface having a bidirectional power feeding function, such as dual-role-power (DRP), which is a device that can switch the power feeding source and power feeding destination.

In Embodiment 1, the power feeding control unit 116 and the power feeding control unit 123 switch the power feeding direction in accordance with the movable time based on the residual power capacity of the power supply 111, and the imageable time based on the residual power capacity of the power supply 125, but may switch the power feeding direction based on different conditions. For example, the power feeding control unit 116 and the power feeding control unit 123 may switch the power feeding direction based on at least either one of the battery voltage of the power supply 111 of the moving apparatus 110 and the battery voltage of the power supply 125 of the imaging apparatus 120. Further, the power feeding control unit 116 and the power feeding control unit 123 may control so that power is fed from the apparatus of which battery voltage is higher to the apparatus of which battery voltage is lower, for example. Furthermore, the power feeding control unit 116 and the power feeding control unit 123 may control such that the power is fed from the power supply 125 to the power supply 111 in a case where the battery voltage of the power supply 111 is less than a predetermined threshold, for example.

In Embodiment 1, the moving imaging system 100 switches the power feeding direction based on the movable time of the moving apparatus 110 and the imageable time of the imaging apparatus 120. If the movable time is less than the imageable time, the moving imaging system 100 controls so that the power is fed from the power supply 125 of the imaging apparatus 120 to the power supply 111 of the moving apparatus 110. If the movable time exceeds the imageable time, the moving imaging system 100 controls so that the power is fed from the power supply 111 to the power supply 125. By controlling in this way, the moving imaging system 100 can suppress a decrease in the movable time while continuing the imaging processing.

Embodiment 2

A configuration of the moving imaging system 100 according to Embodiment 2 is the same as indicated in FIG.

1 and FIGS. 2A and 2B. Unlike Embodiment 1, the time acquisition unit 114 has a function to acquire an estimated moving (flying) time, which is time for the moving apparatus 110 to reach a destination, in addition to acquiring the movable time. The destination may be such a position as a position where the operator of the controller 130 is located, a position where the moving apparatus 110 started flying, or a position where the moving apparatus 110 can safely land, for example. Also unlike Embodiment 1, the time comparison unit 115 has a function to compare the movable time and the estimated moving time, in addition to the function of comparing the movable time and imageable time. Based on the movable time and the estimated moving time, the moving imaging system 100 according to Embodiment 2 controls whether power is fed from the power supply 111 of the moving apparatus 110 to the power supply 125 of the imaging apparatus 120, or power is fed from the power supply 125 to the power supply 111.

Further, in addition to the function described in Embodiment 1, the power feeding control unit 116 of the moving apparatus 110 also has a function to perform a predetermined notification to the controller 130 that can remote control the moving apparatus 110 in a case where the movable time is less than the estimated moving time. The operator of the controller 130 can transmit an instruction in accordance with the predetermined notification (e.g. instruction to request to feed power from the power supply 125 to the power supply 111) to the moving apparatus 110. In this way, the moving imaging system 100 according to Embodiment 2 can prevent the state where the moving apparatus 110 stops driving due to the insufficiency of residual battery capacity. This processing will be described in detail with reference to a flow chart.

FIG. 4 is a flow chart for describing power feeding control processing 400. The power feeding control processing 400 of the moving imaging system 100 according to Embodiment 2 will be described with reference to FIG. 4.

The power feeding control processing 400 is executed by the system control unit 113, the time acquisition unit 114, the time comparison unit 115, the power feeding control unit 116, the power feeding control unit 123 and the controller 130 of the moving imaging system 100. The power feeding control processing 400 is started at a timing when the power of the moving apparatus 110 is turned ON.

In step S401, the time acquisition unit 114 acquires the movable time. In Embodiment 2, just like Embodiment 1, the movable time may be acquired based on the power consumption per-unit-time in a case where the moving apparatus 110 navigates at an average flying speed determined in the apparatus specification and the residual battery capacity of the power supply 111 of the moving apparatus 110 at the present moment. The time acquisition unit 114 may acquire the movable time by a different method.

In step S402, the time acquisition unit 114 acquires the estimated moving time. The estimated moving time is time for the moving apparatus 110 to reach the destination. In Embodiment 2, the time acquisition unit 114 acquires the estimated moving time based on the current coordinates of the moving apparatus 110, a flying distance to the coordinates of the destination provided to the moving imaging system 100 in advance, and the average flying speed of the moving apparatus 110. The current coordinates of the moving apparatus 110 may be acquired from the global positioning system (GPS) installed in the moving imaging system 100. The method of acquiring the estimated moving time is not limited to this. For example, in the case where the moving apparatus 110 remains at a certain position and performs imaging processing in this state, the time to perform the imaging processing in the stopping state may be registered in advance, and the time acquisition unit 114 may acquire the estimated moving time based on the total of the registered time and the time acquired in accordance with the distance.

In step S403, the time comparison unit 115 compares the movable time and the estimated moving time. The system control unit 113 advances processing to step S404 if the movable time is less than the estimated moving time, or ends the power feeding control processing 400 if the movable time exceeds the estimated moving time.

In step S404, the power feeding control unit 116 of the moving apparatus 110 transmits a predetermined notification (including alarm information) to the controller 130 via the wireless communication unit 112. The transmitted predetermined notification includes alarm information to notify the operator that the movable time is less than the estimated moving time.

The wireless communication unit 134 (receiving unit) of the controller 130 receives the predetermined notification transmitted from the moving apparatus 110. The display unit 132 displays the received predetermined notification. Thereby the operator of the controller 130 can recognize the predetermined notification. Further, responding to the predetermined notification, the operator of the controller 130 can determine whether power is fed from the power supply 125 of the imaging apparatus 120 to the power supply 111 of the moving apparatus 110.

The method of transferring the predetermined notification received by the wireless communication unit 134 to the operator of the controller 130 is not limited to displaying the notification on the display unit 132, but may be voice or the like via a speaker connected to the controller 130, for example.

The predetermined notification transmitted by the wireless communication unit 112 of the moving apparatus 110 may include auxiliary information in addition to the information that the movable time is less than the estimated moving time. For example, the auxiliary information may be information indicating how much time the movable time of the moving apparatus 110 is extended if the power feeding control unit 116 of the moving apparatus 110 supplies the entire residual battery capacity of the power supply 125 to the power supply 111. The operator of the controller 130 can determine whether power is fed from the power supply 125 to the power supply 111 with reference to the auxiliary information.

The wireless communication unit 134 of the controller 130 transmits the power feeding instruction to the wireless communication unit 112 of the moving apparatus 110. In Embodiment 2, the operator of the controller 130 presses the button 133 to transmit the power feeding instruction if it is requested to feed power from the power supply 125 to the power supply 111. Responding to pressing the button 133 by the operator of the controller 130, the wireless communication unit 134 transmits the power feeding instruction to request to feed power from the power supply 125 to the power supply 111.

If it is not requested to feed power from the power supply 125 to the power supply 111, the operator of the controller 130 may press a button 133 to end display of the predetermined notification without transmitting the power feeding instruction.

In step S405, the wireless communication unit 112 of the moving apparatus 110 receives the power feeding instruction that was transmitted from the wireless communication unit

134 of the controller 130. The system control unit 113 detects that the wireless communication unit 112 received the power feeding instruction.

In step S406, the system control unit 113 instructs the power feeding control unit 116 and the power feeding control unit 123 to switch the power feeding direction between the power supply 111 and the power supply 125. In Embodiment 2, the system control unit 113 instructs the power feeding control unit 116 and the power feeding control unit 123 to feed power from the power supply 125 to the power supply 111. The system control unit 113 instructs the power feeding control unit 123 using USB communication.

In step S407, the power feeding control unit 116 and the power feeding control unit 123 switch the power feeding direction so that power is fed from the power supply 125 to the power supply 111, and start feeding power.

In step S408, the time comparison unit 115 determines whether the movable time and the estimated moving time match. The time comparison unit 115 may determine that the movable time and the imageable time match in the case where the difference between the movable time and the imageable time is less than a predetermined threshold, just like Embodiment 1. If the movable time and the estimated moving time do not match, the power feeding control unit 116 and the power feeding control unit 123 perform the processing in step S407 again. If the movable time and the estimated moving time match, the system control unit 113 ends the power feeding control processing. The system control unit 113 repeatedly executes the processing steps S401 to S408.

In step S408, the time comparison unit 115 determines whether the movable time and the estimated moving time match, but may also determine based on different conditions. For example, in step S408, the time comparison unit 115 may determine whether the movable time and the imageable time match. Further, in step S408, the power feeding control unit 116 may determine whether the battery of the power supply 111 has charged to a fully charged state. In order to determine whether the battery of the power supply 111 is charged to a fully charged state, the power feeding control unit 116 may control the battery of the power supply 111 to be charged in step S407 using the power supplied from the power supply 125.

In Embodiment 2, as described above, in the case where the movable time is less than the estimated moving time, the power feeding control unit 116 of the moving apparatus 110 transmits a predetermined notification (including alarm information) to the controller 130. In the case where the imaging apparatus 120 registers the schedule time to capture moving images, and the imageable time is less than the scheduled time to capture the moving images, the power feeding control unit 116 of the moving apparatus 110 may perform a predetermined notification to the controller 130. Further, the operator of the controller 130 may transmit an instruction in accordance with the predetermined notification (e.g. instruction to request to feed power from the power supply 111 of the moving apparatus 110 to the power supply 125 of the imaging apparatus 120). Thereby the moving imaging system 100 can prevent the imaging apparatus 120 from stopping driving due to an insufficiency of the residual battery capacity.

In Embodiment 2, the power feeding control unit 116 of the moving apparatus 110 performs a predetermined notification to the controller 130 if the movable time is less than the estimated moving time. Thereby the operator of the controller 130 can recognize that the residual battery capacity of the moving apparatus 110 is insufficient. The operator of the controller 130 can transmit an instruction in accordance with the predetermined notification (e.g. instruction to feed power from the power supply 125 of the imaging apparatus 120 to the power supply 111 of the moving apparatus 110) to the moving apparatus 110. By the power that is fed from the power supply 125 of the imaging apparatus 120, the movable time of the moving apparatus 110 is extended. Thus the moving imaging system 100 can suppress a decrease in movable time while continuing the imaging processing.

Embodiment 3

A configuration of the moving imaging system 100 according to Embodiment 3 is the same as indicated in FIG. 1 and FIGS. 2A and 2B. However, the power feeding control unit 116 and the power feeding control unit 123 further include a function to stop the imaging processing by the imaging apparatus 120 and feeding power from the power supply 125 of the imaging apparatus 120 to the power supply 111 in a case where the residual battery capacity of the power supply 111 of the moving apparatus 110 is less than a first threshold. This processing will be described in detail with reference to a flow chart.

Figure 5:
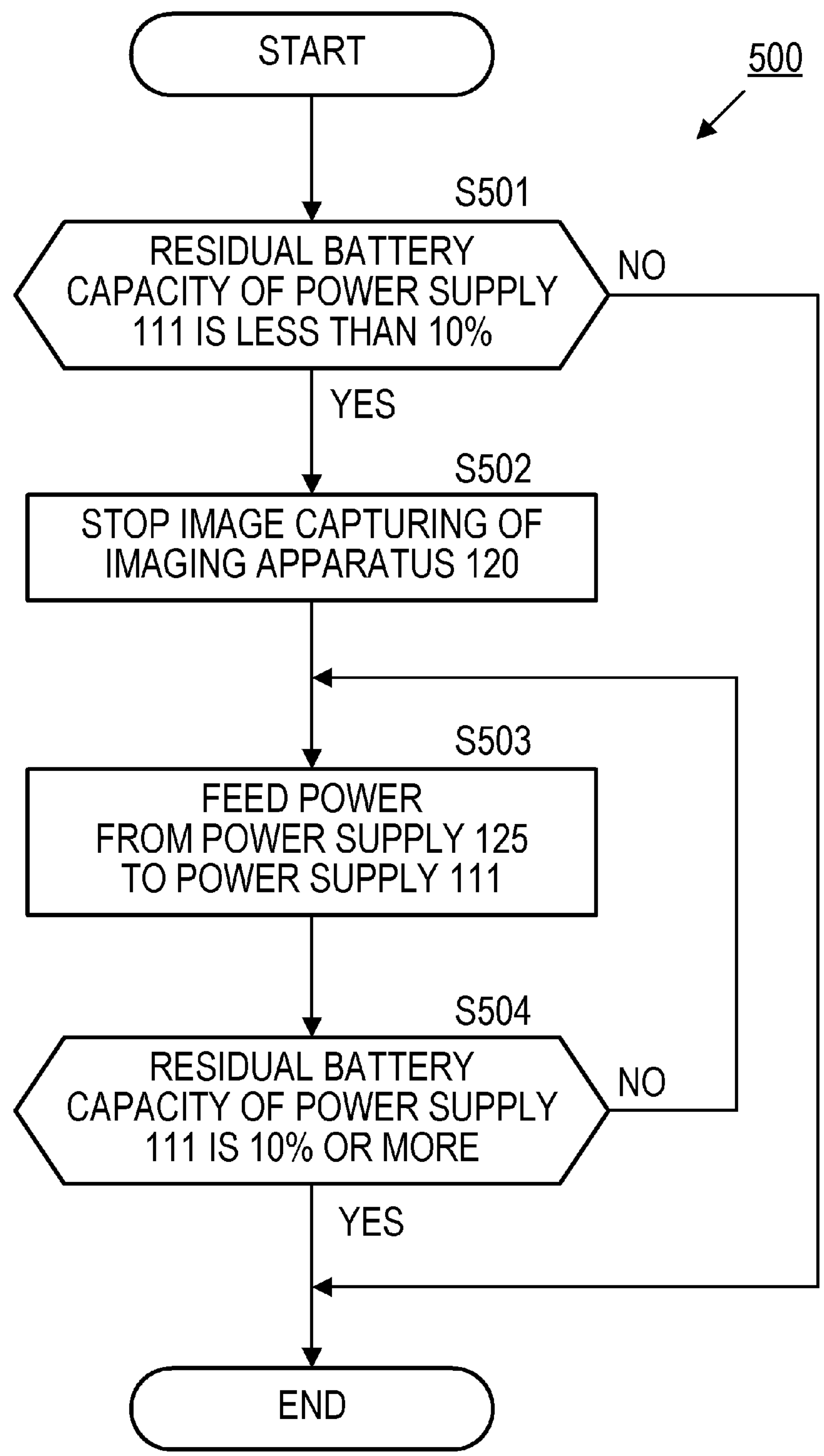
FIG. 5 is a flow chart for describing power feeding control processing 500 according to Embodiment 3.

FIG. 5 is a flow chart for describing the power feeding control processing 500. The power feeding control processing 500 of the moving imaging system 100 according to Embodiment 3 will be described with reference to FIG. 5.

The power feeding control processing 500 is executed by the power feeding control unit 116 and the power feeding control unit 123 of the moving imaging system 100. The power feeding control processing 500 is started at a timing when the power of the moving apparatus 110 is turned ON, and the imaging apparatus 120 starts the imaging processing.

In step S501, the power feeding control unit 116 determines whether the residual battery capacity of the power supply 111 of the moving apparatus is less than a first threshold. In the example in FIG. 5, the first threshold is 10%, and the power feeding control unit 116 determines whether the residual battery capacity of the power supply 111 is less than 10%. If the residual battery capacity of the power supply 111 is 10% or more, the power feeding control unit 116 ends the power feeding control processing 500. If the residual battery capacity of the power supply 111 is less than 10%, the power feeding control unit 116 advances processing to step S502. The first threshold is not limited to 10%, but may be set to a minimum value of the residual capacity of the power supply 111 that is required for the moving apparatus 110 to reach the destination.

In step S502, the power feeding control unit 116 transmits a signal to request a stop of the imaging processing to the imaging apparatus 120 via the wireless communication unit 112. Responding to the received signal, the power feeding control unit 123 of the imaging apparatus 120 instructs the imaging unit 126 to stop the imaging processing. Then the imaging unit 126 stops the imaging processing. The power feeding control unit 123 may control such that the power consumption of the imaging apparatus 120 becomes lower than the current value. For example, the power feeding control unit 123 may control to stop the imaging processing and to enter the standby state, or may control to stop driving of the imaging apparatus 120 itself.

In step S503, the power feeding control unit 116 and the power feeding control unit 123 switch the power feeding direction so that power is fed from the power supply 125 of the imaging apparatus 120 to the power supply 111 of the moving apparatus 110. The power feeding control unit 116 controls such that the battery of the power supply 111 is charged using the power supplied from the power supply 125. Thus in the case where the residual battery capacity of the power supply 111 is less than the first threshold, the power feeding control unit 116 and the power feeding control unit 123 controls such that the power is fed from the power supply 125 to the power supply 111, regardless the magnitude relationship of the residual battery capacity between the power supply 111 and the power supply 125.

In step S504, the power feeding control unit 116 determines whether the residual battery capacity of the power supply 111 exceeds a predetermined threshold. In Embodiment 3, the power feeding control unit 116 determines whether the residual battery capacity of the power supply 111 is 10% or more. If the residual battery capacity of the power supply 111 is 10% or more, the power feeding control unit 116 stops feeding power from the power supply 125 to the power supply 111, and ends the power feeding control processing 500. If the residual battery capacity of the power supply 111 is less than 10%, the power feeding control unit 116 repeats step S503 and step S504. The thresholds used for the determination in step S501 and step S504 may be set to same values, or may be set to different values.

In step S504, the power feeding control unit 116 stops feeding power from the power supply 125 to the power supply 111 if the residual battery capacity of the power supply 111 becomes 10% or more. The first threshold, however, is not limited to this, and the power feeding control unit 116 of the imaging apparatus 120 may control to continue feeding power until it is determined that the power supply 111 is fully charged, or until the residual battery capacity of the power supply 125 empties.

In Embodiment 3, in step S501 the power feeding control unit 116 switches the power feeding direction depending on whether the residual battery capacity of the power supply 111 is less than the first threshold, but may switch the power feeding direction depending on whether the movable time of the moving apparatus 110 is less than a second threshold. If the movable time is less than the second threshold, the power feeding control unit 116 may control to feed the power from the power supply 125 to the power supply 111, regardless the magnitude relationship between the movable time and the imageable time. Here the second threshold may be set to a minimum value of the movable time that is required for the moving apparatus 110 to reach the destination.

For example, the power feeding control unit 116 may switch the power feeding direction depending on whether a value determined by subtracting the movable time from the estimated moving time exceeds a third threshold. For example, when the third threshold is set to two minutes and the value determined by subtracting the movable time from the estimated moving time exceeds two minutes, the power feeding control unit 116 may control to feed power from the power supply 125 to the power supply 111. For example, if the estimated moving time is six minutes when the movable time is three minutes, the power feeding control unit 116 controls to stop the imaging processing of the imaging apparatus 120 and feed power from the power supply 125 to the power supply 111. If the estimated moving time is two minutes when the movable time is three minutes, on the other hand, the power feeding control unit 116 continues imaging processing of the imaging apparatus 120. Thus even if the movable time is the same, the power feeding control unit 116 stops the imaging processing of the imaging apparatus 120 if the value determined by subtracting the movable time from the estimated moving time exceeds the third threshold, and continues the imaging processing by the imaging apparatus 120 if this value is less than the third threshold. By controlling the power feeding direction in accordance with the movable time and the estimated moving time, the moving imaging system 100 can feed power from the power supply 125 to the power supply 111 when it is possible that the moving apparatus 110 may not reach the destination, while continuing the imaging processing of the imaging apparatus 120.

In Embodiment 3, in a case where the residual battery capacity of the power supply 111 of the moving apparatus 110 is less than the first threshold, the moving imaging system 100 controls to stop the imaging processing of the imaging apparatus 120. Further, the power feeding control unit 116 and the power feeding control unit 123 control such that power is fed from the power supply 125 of the imaging apparatus 120 to the power supply 111. Thereby the moving imaging system 100 can decrease the possibility of the moving apparatus 110 not reaching the destination due to an insufficiency of the residual battery capacity of the power supply 111.

Embodiment 4

A configuration of the moving imaging system 100 according to Embodiment 4 is the same as indicated in FIG. 1 and FIGS. 2A and 2B. In Embodiment 2, if the movable time is less than the estimated moving time, the controller 130 of the moving imaging system 100 receives a predetermined notification to indicate this state, and displays the predetermined notification on the display unit 132. In Embodiment 4, the controller 130 has a function to display information related to the residual battery capacity of the moving apparatus 110 and the imaging apparatus 120 as well.

Figure 6:
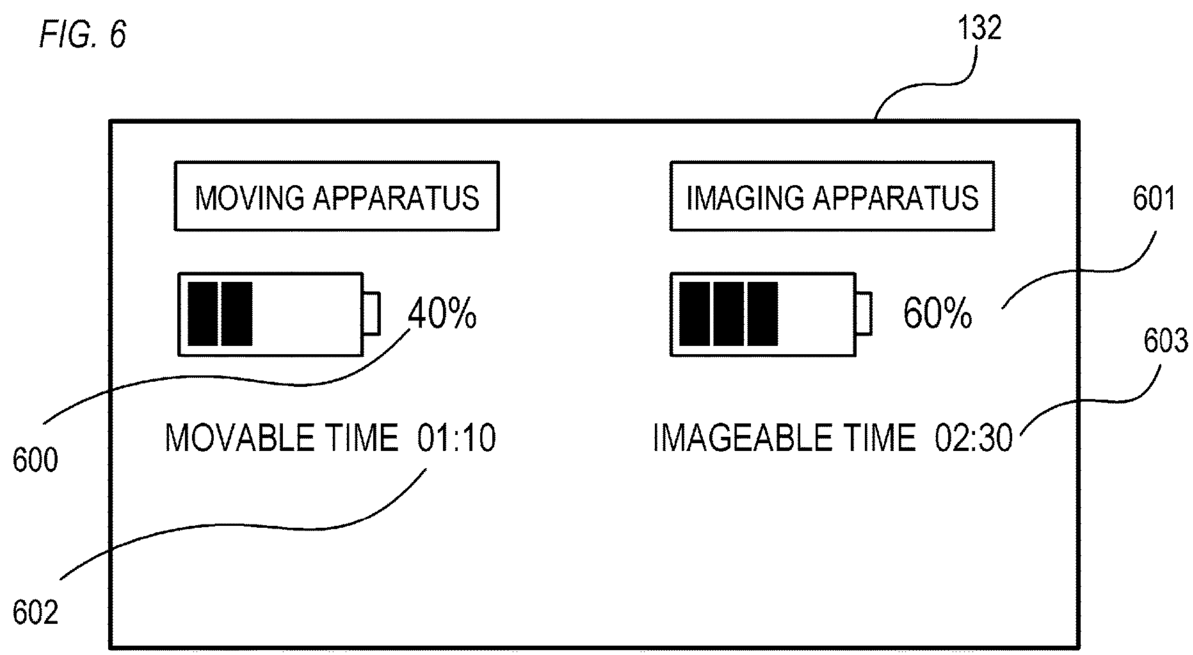
FIG. 6 is a display example of information that is displayed on a display unit 132 of a controller 130 according to Embodiment 4.

FIG. 6 is an example of a state where the residual battery capacity of the power supply 111 and the movable time of the moving apparatus 110, and the residual battery capacity of the power supply 125 and the imageable time of the imaging apparatus 120, are displayed on the display unit 132 of the controller 130.

Residual capacity 600 indicates the residual battery capacity of the power supply 111. Residual capacity 601 indicates the residual battery capacity of the power supply 125. For the residual capacity 600 and the residual capacity 601, the residual battery capacity of each power supply may be displayed by an icon and percentage. In FIG. 6, the residual capacity 600 indicates that the residual battery capacity of the power supply 111 is 40%, and the residual capacity 601 indicates that the residual battery capacity of the power supply 125 is 60%.

Time 602 indicates the movable time of the moving apparatus 110. Time 603 indicates the imageable time of the imaging apparatus 120. In FIG. 6, the time 602 indicates that the movable time is one hour and ten minutes, and the time 603 indicates that the imageable time is two hours and thirty minutes.

On the display unit 132, information on the estimated moving time, battery voltage of the power supply 111, battery voltage of the power supply 125, and the like may also be displayed.

The controller 130 may display the information on the residual battery capacity of the moving apparatus 110 and that of the imaging apparatus 120 in the case where the predetermined notification is received in Embodiment 2.

Further, the controller 130 may display various information transferred from the moving apparatus 110 to the controller 130 on the display unit 132 in accordance with the operation by the operator.

By the information on the residual battery capacity of the moving apparatus 110 and that of the imaging apparatus 120 displayed on the display unit 132 of the controller 130, the operator of the controller 130 can recognize the states of the moving apparatus 110 and the imaging apparatus 120. Thereby the operator of the controller 130 can determine the switching of the power feeding direction, for example, and prevent the aerial image capturing by the moving imaging system 100 from being interrupted at a timing unintended by the operator.

Embodiment 5

A configuration of the moving imaging system 100 according to Embodiment 5 is the same as indicated in FIG. 1 and FIGS. 2A and 2B. In Embodiments 1 to 3, the power feeding control unit 116 and the power feeding control unit 123 control the power feeding direction based on the magnitude relationship between the movable time and the imageable time or estimated moving time. In Embodiment 5, however, the power feeding control unit 116 and the power feeding control unit 123 control the power feeding direction in accordance with the control instruction by the operator which is transmitted from the controller 130.

Figure 7:
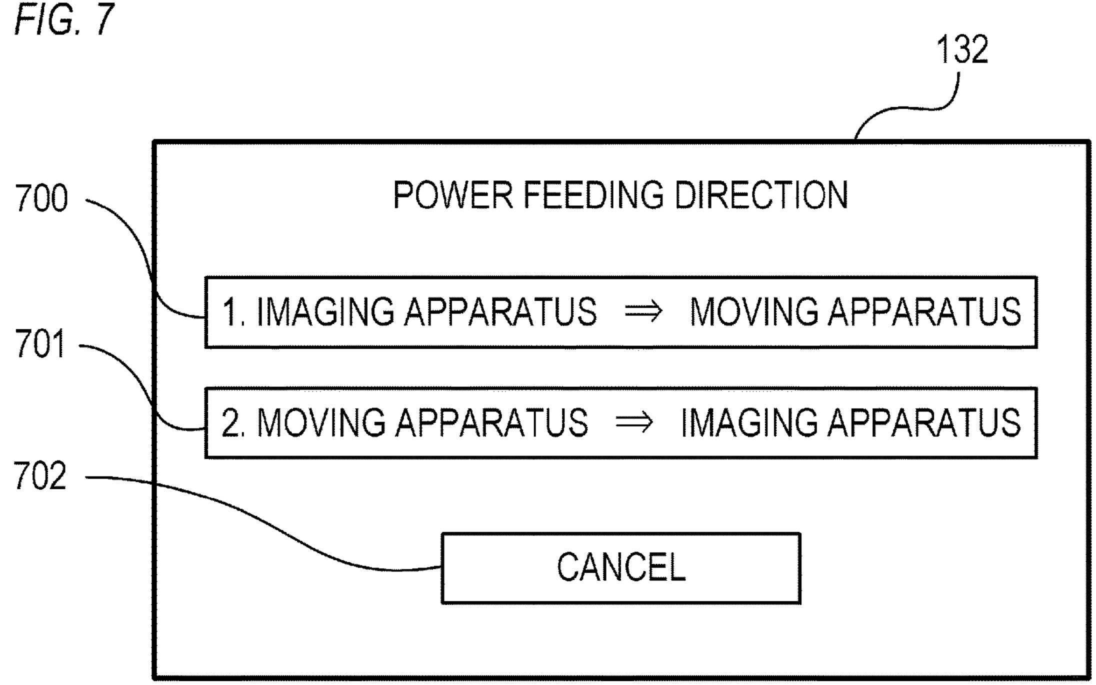
FIG. 7 is a display example of choices of the power feeding direction that is displayed on the display unit 132 of the controller 130 according to Embodiment 5.

FIG. 7 is a display example of the power feeding direction switching choices displayed on the display unit 132 of the controller 130. Choice 700 and choice 701 are the choices selectable by the operator of the controller 130, whereby a control instruction to switch the power feeding direction is transmitted to the power feeding control unit 116 and the power feeding control unit 123. If the choice 700 is selected, the wireless communication unit 134 (transmitting unit) of the controller 130 transmits a control instruction to feed power from the power supply 125 of the imaging apparatus 120 to the power supply 111 of the moving apparatus 110. If the choice 701 is selected, the wireless communication unit 134 transmits a control instruction to feed power from the power supply 111 to the power supply 125. A choice 702 is a choice that is used to cancel selection of the switching of the power feeding direction. By transmitting a control instruction in accordance with the choice, the operator of the controller 130 can switch the power feeding direction between the power supply 111 and the power supply 125.

The choices 700 to 702 are selected by the operation of the buttons 133 of the controller 130, for example. In a case where the controller 130 has a voice recognition function, the choices 700 to 702 may be selected by voice recognition, or the like.

In Embodiment 5, the wireless communication unit 134 may transmit a control instruction to switch the power feeding direction at a timing when the predetermined notification described in Embodiment 2 is received. The display unit 132 may display the choices 700 to 702 at the timing when the predetermined notification described in Embodiment 2 is received.

The wireless communication unit 134 may restrict the transmission of the control instruction to switch the power feeding direction considering the movable time and other conditions. The case where transmission of the control instruction to switch the power feeding direction to the direction from the power supply 111 to the power supply 125 is restricted, may be the case where the movable time is less than five minutes, or the case where the movable time is less than the imageable time, for example. In such cases, the wireless communication unit 134 may control such that the control instruction to switch the power feeding direction to the direction from the power supply 111 to the power supply 125 is not transmitted. Furthermore, the display unit 132 may display such that the choice 701 is not selectable. Thereby in the case where the residual battery capacity of the moving apparatus 110 is sufficient, for example, the power is fed from the power supply 111 to the power supply 125 of the imaging apparatus 120, and the state where the moving apparatus 110 does not reach the destination can be prevented.

In Embodiment 5, the power feeding control unit 116 and the power feeding control unit 123 control the power feeding direction in accordance with the control instruction by the operator, which is transmitted from the controller 130. Thereby the operator of the controller 130 can switch the power feeding direction between the power supply 111 and the power supply 125.

Embodiment 6

Various functions, processing steps or methods described in the above embodiments may also be implemented by a personal computer, microcomputer, a central processing unit (CPU) or a microprocessor executing a program. In Embodiment 6, the personal computer, the microcomputer, the CPU or the microprocessor is called “computer X”. Further in Embodiment 6, a program for controlling the computer X and for implementing at least one of the various functions, processing steps and methods described in the above embodiments is called a “program Y”.

Various functions, processing steps or methods described in the above embodiments can be implemented by the computer X executing the program Y. In this case, the program Y is supplied to the computer X via a computer-readable storage medium. The computer-readable storage medium in Embodiment 6 includes at least one of a hard disk device, a magnetic storage device, an optical storage device, a magneto-optical storage device, a memory card, a volatile memory, a non-volatile memory, and the like. The computer-readable storage medium in Embodiment 6 is a non-transitory storage medium.

According to the present disclosure, in an imaging system constituted of a moving apparatus and an imaging apparatus, a decrease in movable time can be suppressed while continuing the imaging processing.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a ‘non-transitory computer-readable storage medium’) to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-155261, filed on Sep. 24, 2021, which is hereby incorporated by reference herein in its entirety.

What is claimed is:

1. An imaging system having an imaging apparatus and a moving apparatus that moves with the imaging apparatus mounted thereon, the imaging system comprising at least one memory and at least one processor which function as:

a first acquisition unit configured to acquire a movable time, which is a time when the moving apparatus is capable of moving, based on a residual battery capacity of a first power supply that supplies power to the moving apparatus;

a second acquisition unit configured to acquire an imageable time, which is a time when the imaging apparatus is capable of imaging, based on a residual battery capacity of a second power supply that supplies power to the imaging apparatus; and a control unit configured to control whether power is fed from the second power supply to the moving apparatus or power is fed from the first power supply to the imaging apparatus, based on at least one of the movable time and the imageable time.

2. The imaging system according to claim 1, wherein the control unit performs control so that power is fed from the second power supply to the moving apparatus in a case where the movable time is less than the imageable time, and controls so that power is fed from the first power supply to the imaging apparatus in a case where the movable time exceeds the imageable time.

3. The imaging system according to claim 1, wherein until a difference between the movable time and the imageable time becomes a predetermined threshold or less, the control unit performs control so that power is fed from the second power supply to the moving apparatus in a case where the movable time is less than the imageable time, and power is fed from the first power supply to the imaging apparatus in a case where the movable time exceeds the imageable time.

4. The imaging system according to claim 2, wherein in a case where the movable time is less than a second threshold, the control unit performs control so that power is fed from the second power supply to the moving apparatus, regardless a magnitude relationship between the movable time and the imageable time.

5. The imaging system according to claim 1, wherein the first acquisition unit acquires a movable time, which is a time when the moving apparatus is capable of moving, and an estimated moving time, which is a time for the moving apparatus to reach a destination, based on the residual battery capacity of the first power supply, and the control unit performs control on whether the power is fed from the second power supply to the moving apparatus or power is fed from the first power supply to the imaging apparatus, based on the movable time and the estimated moving time.

6. The imaging system according to claim 5, wherein the control unit performs control to feed power from the second power supply to the moving apparatus in a case where the movable time is less than the estimated moving time.

7. The imaging system according to claim 1, wherein the control unit performs control to feed power from the second power supply to the moving apparatus in a case where the residual battery capacity of the first power supply is less than a first threshold.

8. The imaging system according to claim 1, wherein the control unit feeds power from the second power supply to a power supply circuit of the moving apparatus in a case where power is fed from the second power supply to the moving apparatus, and feeds power from the first power supply to a power supply circuit of the imaging apparatus in a case where power is fed from the first power supply to the imaging apparatus.

9. The imaging system according to claim 1, further comprising a controller which includes: a receiving unit configured to receive a notification from the imaging apparatus; and a transmitting unit configured to receive an instruction from a user for the notification, and transmit the instruction from the user to the moving apparatus, wherein the control unit controls a power feeding direction in accordance with the instruction from the user.

10. The imaging system according to claim 9, wherein the instruction from the user includes an instruction on whether power is fed from the second power supply to the moving apparatus, or power is fed from the first power supply to the imaging apparatus.

11. The imaging system according to claim 9, wherein the notification received by the controller includes information on at least any of the residual battery capacity of the first power supply, the residual battery capacity of the second power supply, the movable time which is a time when the moving apparatus is capable of moving, the imageable time which is a time when the imaging apparatus is capable of imaging, and the estimated moving time which is a time taken for the moving apparatus to reach a destination.

12. The imaging system according to claim 11, wherein the notification received by the controller notifies that the movable time is less than the estimated moving time, and the instruction from the user instructs to feed power from the second power supply to the moving apparatus.

13. The imaging system according to claim 9, wherein the controller further comprises a display unit configured to display the notification received from the moving apparatus.

14. An imaging method for an imaging system having an imaging apparatus and a moving apparatus that moves with the imaging apparatus mounted thereon, the imaging method comprising steps of:

acquiring a movable time, which is a time when the moving apparatus is capable of moving, based on a residual battery capacity of a first power supply that supplies power to the moving apparatus;

acquiring an imageable time, which is a time when the imaging apparatus is capable of imaging, based on a residual battery capacity of a second power supply that supplies power to the imaging apparatus; and controlling whether power is fed from the second power supply to the moving apparatus or power is fed from the first power supply to the imaging apparatus, based on at least one of the movable time and the imageable time.

15. A non-transitory computer-readable storage medium storing a program to cause a computer to execute an imaging method for an imaging system having an imaging apparatus and a moving apparatus that moves with the imaging apparatus mounted thereon, the imaging method comprising steps of:

acquiring a movable time, which is a time when the moving apparatus is capable of moving, based on a residual battery capacity of a first power supply that supplies power to the moving apparatus;

acquiring an imageable time, which is a time when the imaging apparatus is capable of imaging, based on a residual battery capacity of a second power supply that supplies power to the imaging apparatus; and controlling whether power is fed from the second power supply to the moving apparatus or power is fed from the first power supply to the imaging apparatus, based on at least one of the movable time and the imageable time.

16. A moving apparatus moving with an imaging apparatus mounted thereon, the moving apparatus comprising:

a first acquisition unit configured to acquire a movable time, which is a time when the moving apparatus is capable of moving, based on a residual battery capacity of a first power supply that supplies power to the moving apparatus;

a second acquisition unit configured to acquire information on an imageable time, which is a time when the imaging apparatus is capable of imaging, from the imaging apparatus; and a control unit configured to control whether power is fed from a second power supply, which supplies power to the imaging apparatus, to the moving apparatus, or power is fed from the first power supply to the imaging apparatus, based on at least one of the movable time and the imageable time.

* * * * *